United States Patent
Taguchi et al.

(10) Patent No.: US 9,747,932 B1
(45) Date of Patent: Aug. 29, 2017

(54) MAGNETIC RECORDING HEAD AND DISK DEVICE COMPRISING THE SAME

(71) Applicant: Kabushiki Kaisha Toshiba, Minato-ku, Tokyo (JP)

(72) Inventors: Tomoko Taguchi, Tokyo (JP); Tomomi Funayama, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/267,438

(22) Filed: Sep. 16, 2016

(30) Foreign Application Priority Data

Feb. 29, 2016 (JP) .................................. 2016-037316

(51) Int. Cl.
   *G11B 5/127* (2006.01)
   *G11B 5/39* (2006.01)
   *G11B 5/60* (2006.01)
   *G11B 5/17* (2006.01)

(52) U.S. Cl.
   CPC .......... *G11B 5/3909* (2013.01); *G11B 5/1278* (2013.01); *G11B 5/17* (2013.01); *G11B 5/6082* (2013.01)

(58) Field of Classification Search
   None
   See application file for complete search history.

(56) References Cited

U.S. PATENT DOCUMENTS

| | | | |
|---|---|---|---|
| 6,980,402 B2 | 12/2005 | Shinjo | |
| 8,553,359 B2 | 10/2013 | Yamada et al. | |
| 8,937,789 B2 | 1/2015 | Watanabe et al. | |
| 2011/0205667 A1* | 8/2011 | Yamada | B82Y 10/00 360/122 |
| 2015/0380022 A1* | 12/2015 | Koui | G11B 5/235 360/99.08 |

FOREIGN PATENT DOCUMENTS

JP        2010-034951        2/2010

* cited by examiner

*Primary Examiner* — Will J Klimowicz
(74) *Attorney, Agent, or Firm* — White & Case LLP

(57) ABSTRACT

According to one embodiment, a magnetic recording head includes an air bearing surface, a magnetic core including a main magnetic pole and a write shield arranged to face the main magnetic pole with a write gap, a coil, and a high-frequency oscillator provided between the main magnetic pole and the write shield in the write gap. The magnetic core includes an opposite surface facing a film surface of the high-frequency oscillator, a magnetic layer, and a nonmagnetic layer in which magnetic microparticles are dispersed. The nonmagnetic layer is provided outside the magnetic layer in at least a part of the opposite surface of the magnetic core.

13 Claims, 18 Drawing Sheets

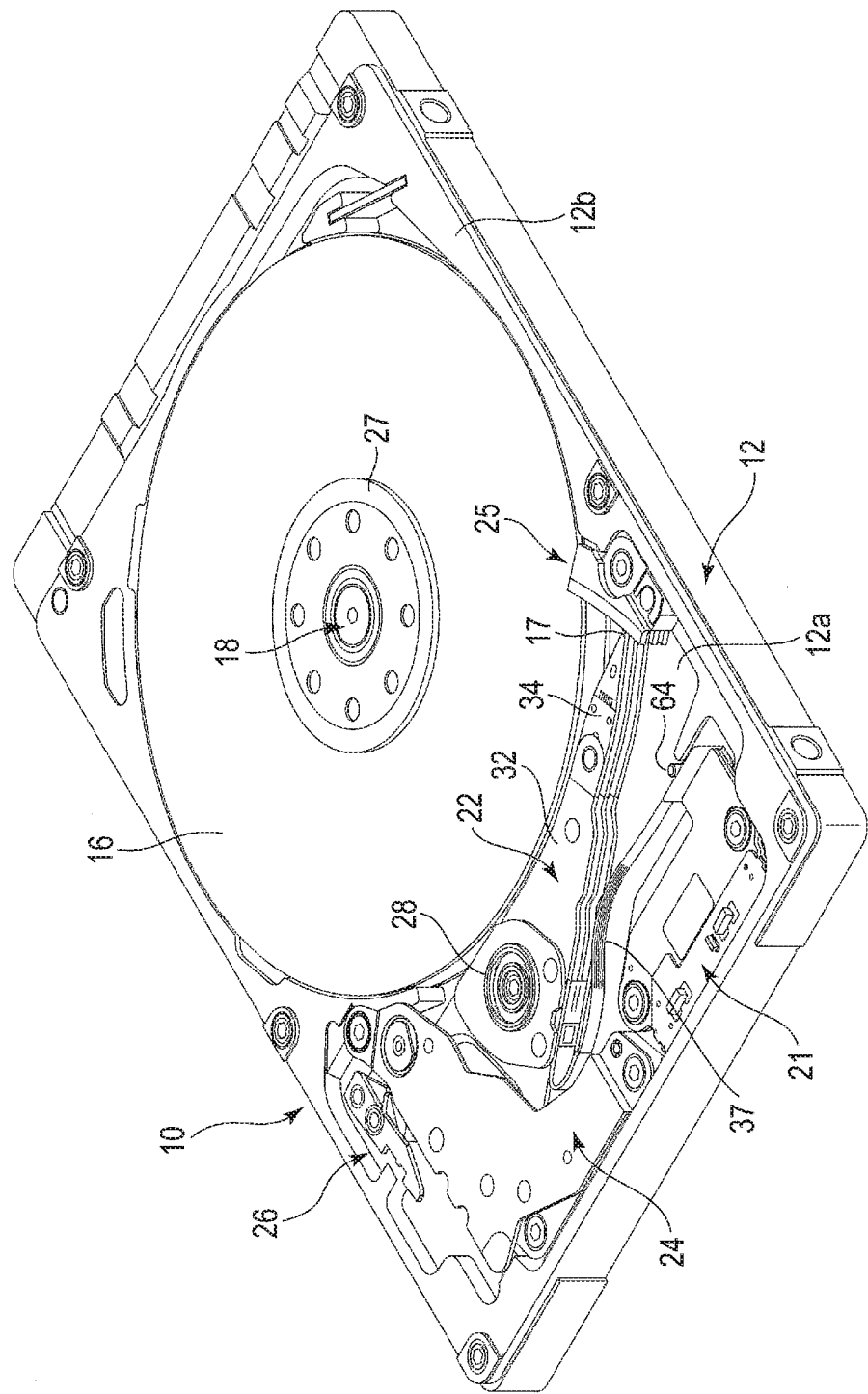
F I G. 1

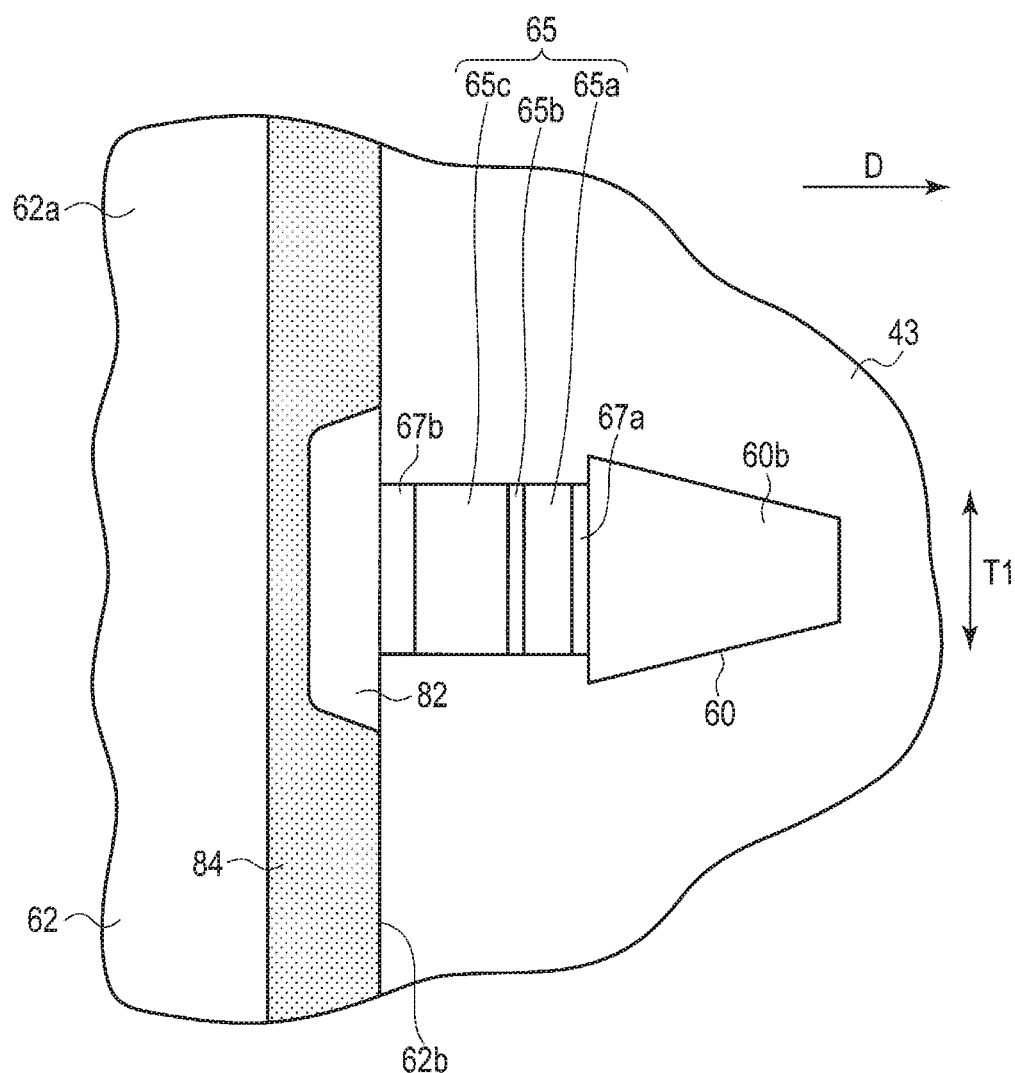
F I G. 15

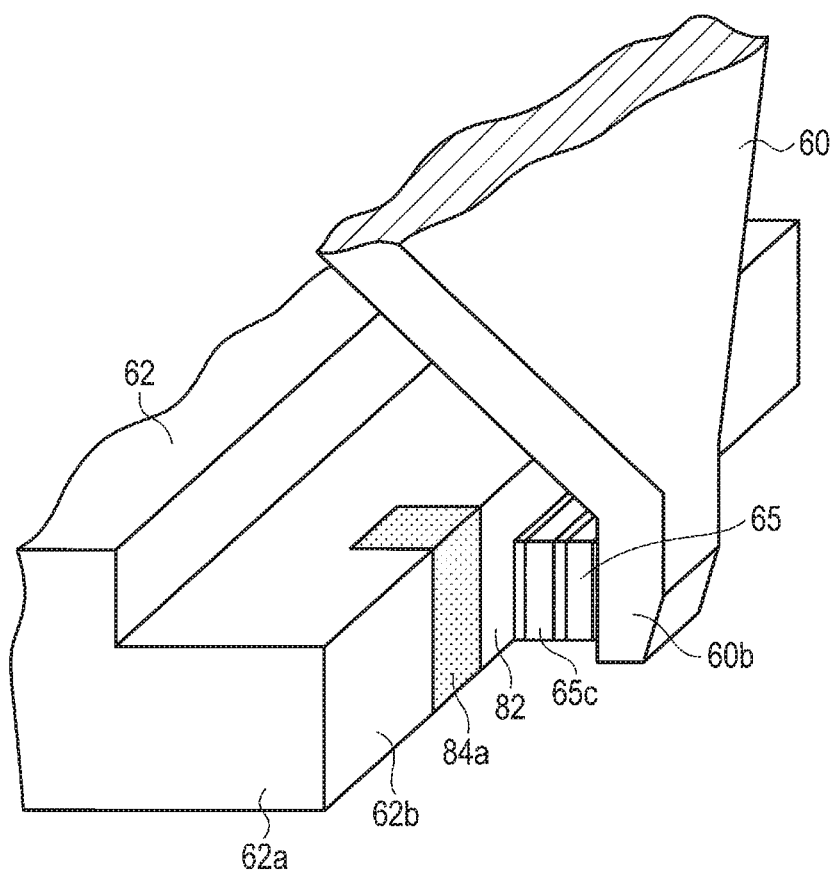
F I G. 16

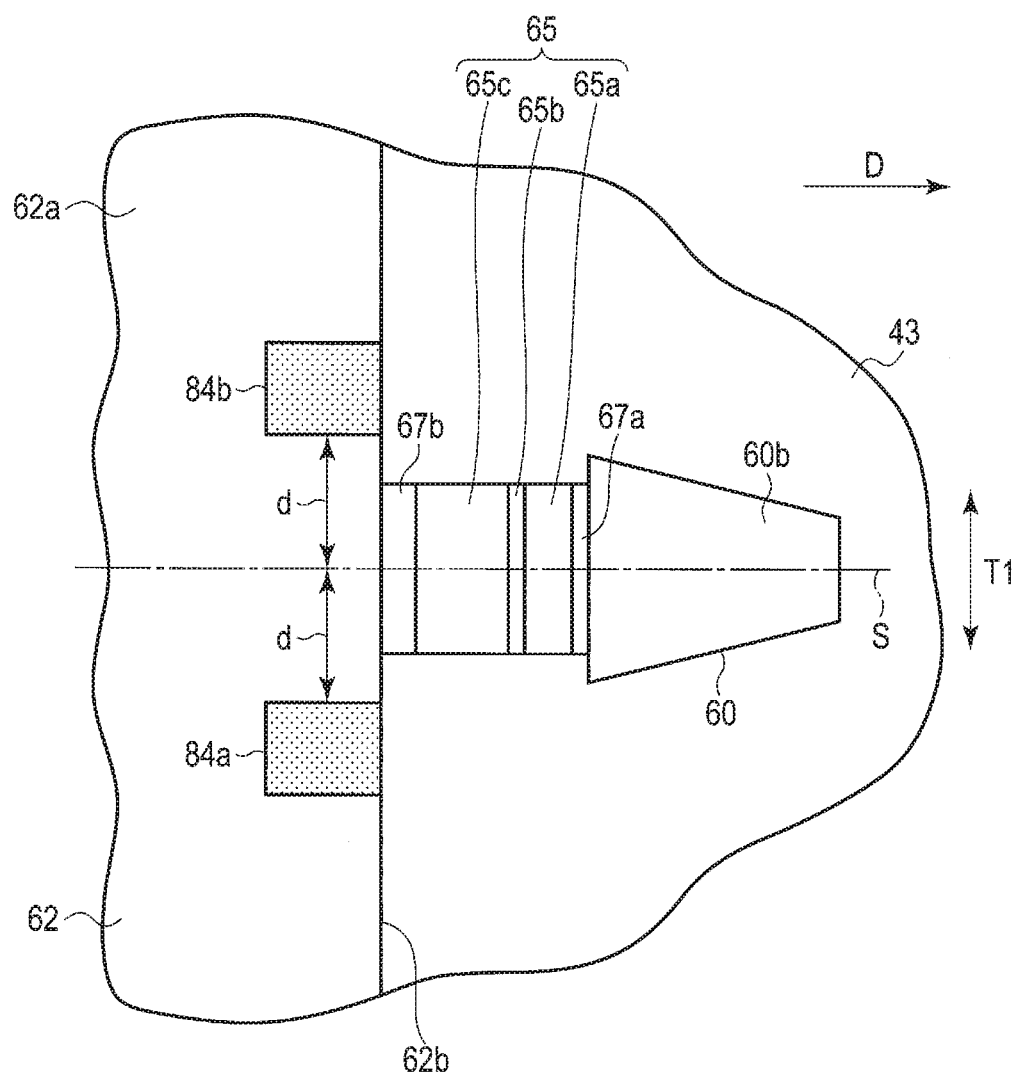
F I G. 17

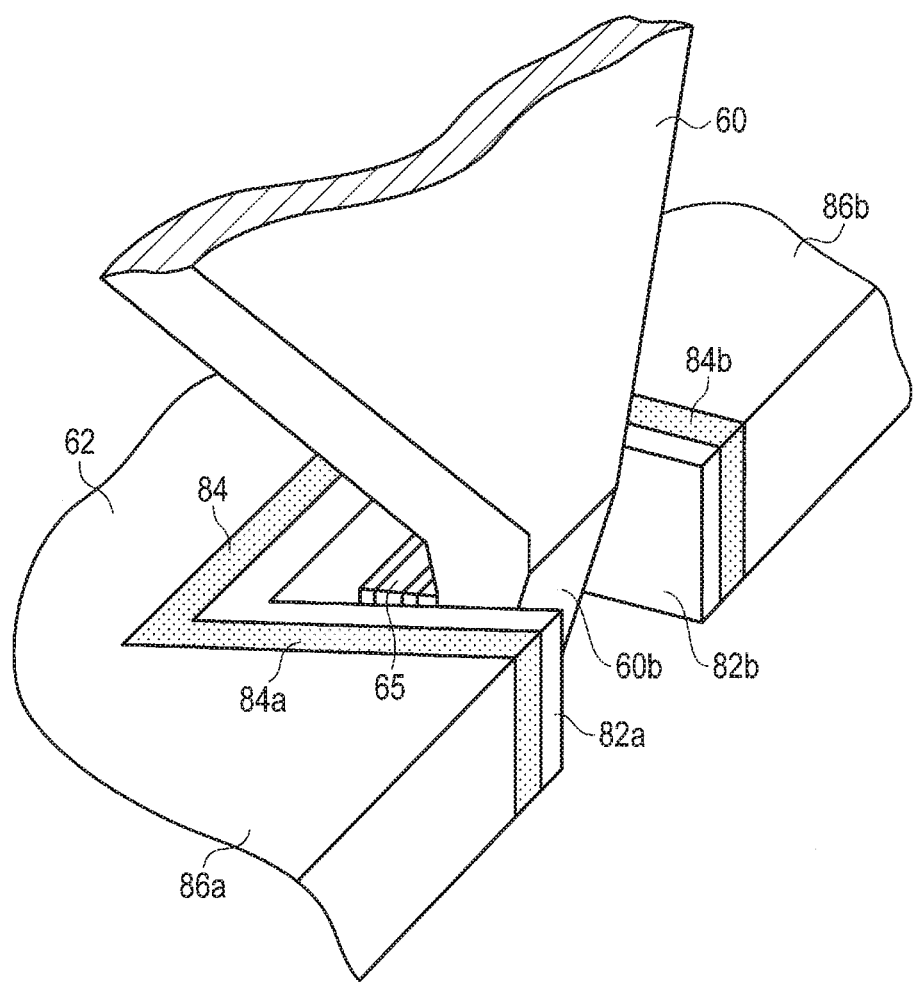
F I G. 20

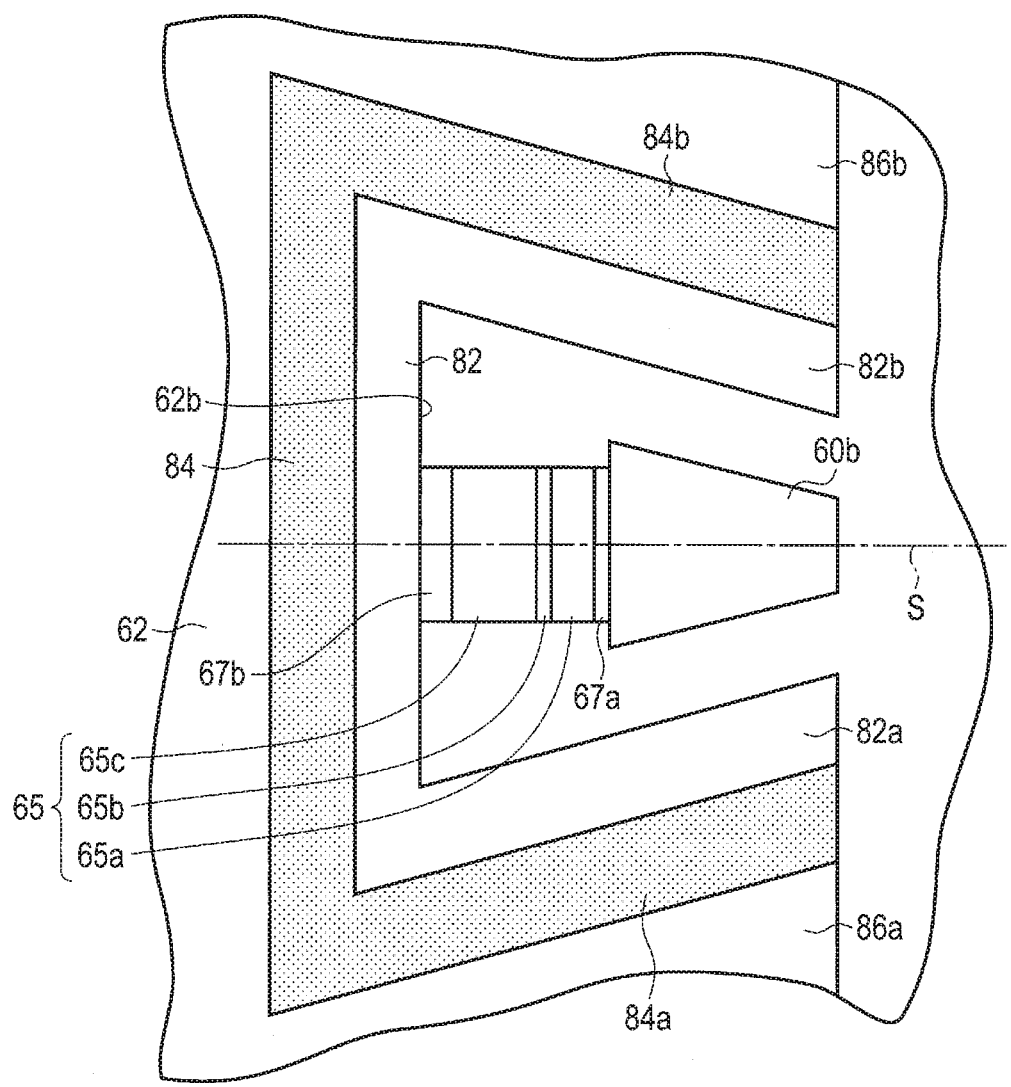
F I G. 21

MAGNETIC RECORDING HEAD AND DISK DEVICE COMPRISING THE SAME

CROSS-REFERENCE TO RELATED APPLICATIONS

This application is based upon and claims the benefit of priority from Japanese Patent Application No. 2016-037316, filed Feb. 29, 2016, the entire contents of which are incorporated herein by reference.

FIELD

Embodiments described herein relate generally to a magnetic recording head comprising a high-frequency-assisted element, and a disk device comprising the magnetic recording head.

BACKGROUND

In recent years, a magnetic head for perpendicular magnetic recording has been suggested to realize high recording density, large capacity or miniaturization of a magnetic disk device as a disk device. In this type of magnetic head, a recording head includes a main magnetic pole which produces a perpendicular magnetic field, a write shield magnetic pole provided on the trailing side of the main magnetic pole across an intervening write gap, and a coil for supplying a magnetic flux to the main magnetic pole. Further, the following high-frequency (microwave) assisted head has been suggested. In the high-frequency assisted head, a high-frequency (microwave) oscillator such as a spin-torque oscillator is provided in the write gap between the write shield magnetic pole and the main magnetic pole. Current is supplied to the spin-torque oscillator through the main magnetic pole and the write shield magnetic pole.

In the high-frequency-assisted head, the spin injection layer and the oscillation layer of the high-frequency oscillator are allocated in the write gap. In the high-frequency-assisted head having this structure, the magnetization near the surface of the write shield or the main magnetic pole facing the surface of the oscillation layer vibrates so as to be synchronized with the rotation of magnetization of the oscillation layer. Thus, a spin wave is generated. This spin wave may disturb the rotation of magnetization of the high-frequency oscillator and inhibit the assist effect.

BRIEF DESCRIPTION OF THE DRAWINGS

FIG. 1 is a perspective view showing a hard disk drive (HDD) according to a first embodiment.

FIG. 15 is a plan view showing the apical end portion of the magnetic recording head when viewed from the ABS side according to the second embodiment.

FIG. 16 is an enlarged perspective view schematically showing the apical end portion of a magnetic recording head in an HDD according to a third embodiment.

FIG. 17 is a plan view showing the apical end portion of the magnetic recording head when viewed from the ABS side according to the third embodiment.

FIG. 20 is an enlarged perspective view schematically showing the apical end portion of a magnetic recording head in an HDD according to a fifth embodiment.

FIG. 21 is a plan view showing the apical end portion of the magnetic recording head when viewed from the ABS side according to the fifth embodiment.

DETAILED DESCRIPTION

Various embodiments will be described hereinafter with reference to the accompanying drawings. In general, according to one embodiment, a magnetic recording head comprises: an air bearing surface; a magnetic core comprising a main magnetic pole formed of a high-magnetic-permeability material and comprising an apical end portion extending to the air bearing surface; and a write shield formed of a high-magnetic-permeability material, the write shield being arranged to face the main magnetic pole through a nonconductive layer on a deep side apart from the air bearing surface, and to face the apical end portion of the main magnetic core on the air bearing side through a conductive nonmagnetic layer with a write gap; a coil provided so as to pass across the magnetic core; a high-frequency oscillator provided between the main magnetic pole and the write shield in the write gap; and a pair of current terminals for supplying direct current between the main magnetic pole and the write shield. The magnetic core comprises an opposite surface facing a film surface of the high-frequency oscillator, a magnetic layer formed of a high-magnetic-permeability material, and a nonmagnetic layer in which magnetic microparticles are dispersed, the nonmagnetic layer being provided outside the magnetic layer in at least a part of the opposite surface of the magnetic core.

First Embodiment

Figure 2:
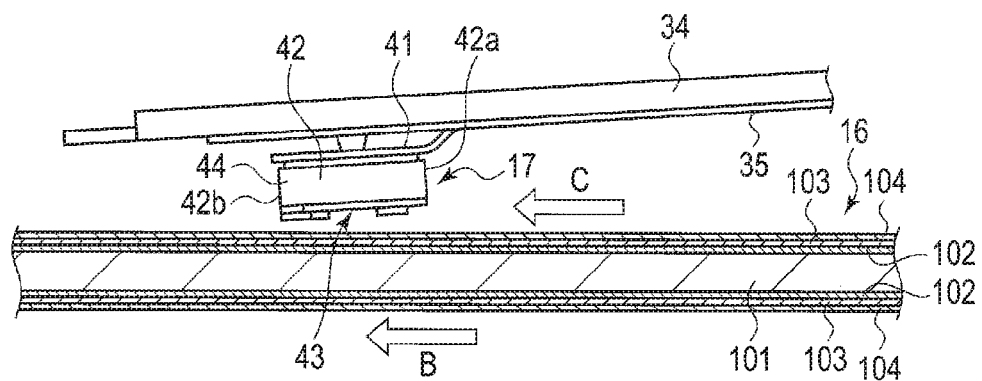
FIG. 2 is a side view showing a magnetic head and a suspension in the HDD.

FIG. 1 shows an internal structure of a hard disk drive (HDD) according to a first embodiment, with a top cover detached therefrom, and FIG. 2 shows a magnetic head in a flying state. As shown in FIG. 1, the HDD comprises a housing 10. The housing 10 comprises a base 12 having the shape of a rectangular box which is open on its upper side, and a top cover (not shown) which is secured to the base 12 by a plurality of screws and closes the upper end opening of the base 12. The base 12 includes a rectangular bottom wall 12a and a sidewall 12b provided upright along the peripheral edge of the bottom wall.

As recording media, for example, two magnetic disks 16 are provided in the housing 10. Further, a spindle motor 18 is provided in the housing 10 as a drive section which supports and rotates the magnetic disks 16. The spindle motor 18 is provided on the bottom wall 12a. Each magnetic disk 16 is formed so as to have a diameter of, for example, approximately 2.5 inches (6.35 cm) and comprises a magnetic recording layer on at least one of the upper and lower surfaces. The magnetic disks 16 engage coaxially with a hub (not shown) of the spindle motor 18, and are clamped by a clamp spring 27, thereby being fixed to the hub. The magnetic disks 16 are supported parallel to the bottom wall 12a of the base 12. The magnetic disks 16 are rotated at a predetermined speed by the spindle motor 18.

A plurality of magnetic heads 17 and a carriage assembly 22 are provided in the housing 10. The magnetic heads 17 are configured to write and read data to and from the magnetic disks 16. The carriage assembly 22 supports the magnetic heads 17 such that they are movable with respect to the magnetic disks 16. In the housing 10 are arranged a voice coil motor (VCM) 24, a ramp load mechanism 25, a latch mechanism 26 and a flexible printed circuit (FPC) unit 21. The VCM 24 rotates and positions the carriage assembly 22. When the magnetic heads 17 are moved to the outermost circumferential part of the magnetic disks 16, the ramp load mechanism 25 holds the magnetic heads 17 in unload positions where they are separated from the magnetic disks 16. The latch mechanism 26 holds the carriage assembly 22 in a retreat position when an impact, etc., acts on the HDD. The FPC unit 21 includes electronic components such as a conversion connector.

A control circuit board (not shown) is screwed to the external surface of the base 12 and faces the bottom wall 12a. The control circuit board controls the operation of the spindle motor 18, and controls the operations of the VCM 24 and the magnetic heads 17 through the FPC unit 21.

The carriage assembly 22 comprises a bearing unit 28 secured onto the bottom wall 12a of the base 12, a plurality of arms 32 extending from the bearing unit 28, and suspensions 34 which are allowed to elastically deform and have the shape of a slender plate. The magnetic heads 17 are supported at the extended ends of the suspensions 34. The suspensions 34 and the magnetic heads 17 face each other with the magnetic disks 16 being interposed.

As shown in FIG. 2, each magnetic head 17 is structured as a flying head, and comprises a slider 42 having substantially the shape of a rectangular parallelepiped and a head portion 44 for reading and writing at the outflow end (trailing end) of the slider 42. The magnetic head 17 is secured to a gimbal spring 41 provided at the apical end portion of the suspension 34. As shown in FIG. 1 and FIG. 2, each magnetic head 17 is electrically connected to the FPC unit 21 via a trace member 35 secured onto the suspension 34 and the arm 32, and a relay FPC 37.

Figure 3:
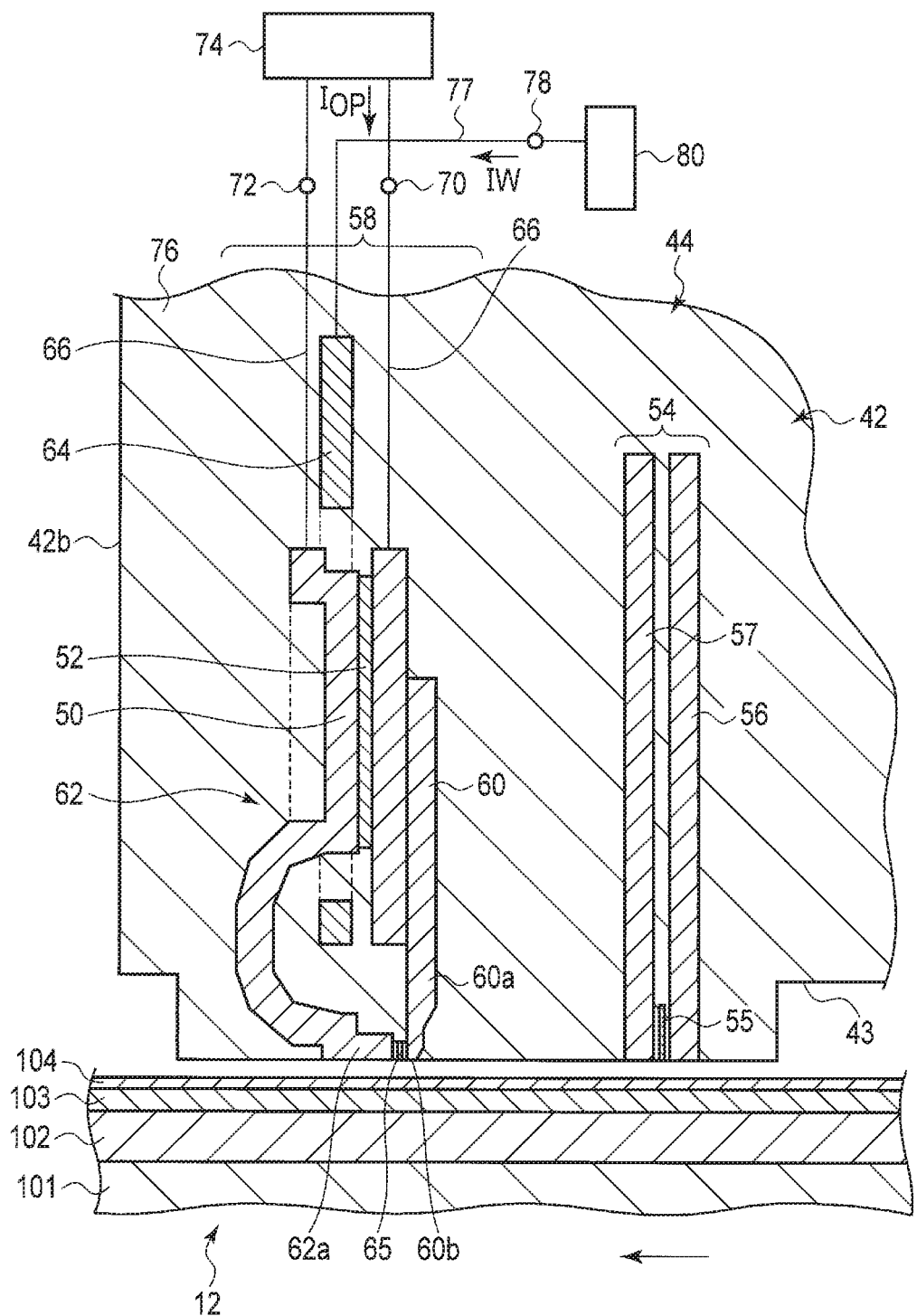
FIG. 3 is an enlarged cross-sectional view showing a head portion of the magnetic head.

Now, the structures of the magnetic disks 16 and the magnetic heads 17 are described in detail. FIG. 3 is an enlarged cross-sectional view showing the head portion 44 of the magnetic head 17 and the magnetic disk 16.

As shown in FIG. 1 to FIG. 3, the magnetic disk 16 comprises a substrate 101 formed of a nonmagnetic material in the shape of a circular disk having a diameter of, for example, approximately 2.5 inches (6.35 cm). On each surface of the substrate 101, a soft magnetic layer 102 as a foundation layer, a magnetic recording layer 103 and a protective film layer 104 are stacked in order. The soft magnetic layer 102 is formed of a material showing soft magnetic properties. The magnetic recording layer 103 has magnetic anisotropy in a direction perpendicular to the disk surface.

As shown in FIG. 2 and FIG. 3, the slider 42 of the magnetic head 17 is formed by, for example, a sintered body (AlTiC) of alumina and titanium-carbide. The head portion 44 is formed by stacking thin films. The slider 42 comprises a rectangular disk-facing surface (air bearing surface [ABS]) 43 facing the surface of the magnetic disk 16. The slider 42 is caused to fly by an air flow C produced between the disk surface and the ABS 43 by the rotation of the magnetic disk 16. The direction of the air flow C conforms to the rotational direction B of the magnetic disk 16. The slider 42 is provided such that the longitudinal direction of the ABS 43 substantially conforms to the direction of the air flow C relative to the surface of the magnetic disk 16.

The slider 42 comprises a leading end 42a located on the inflow side of the air flow C and a trailing end 42b located on the outflow side of the air flow C. On the ABS 43 of the slider 42, for example, a leading step, a trailing step, a side step and a negative-pressure cavity are formed (not shown).

As shown in FIG. 3, the head portion 44 comprises a reading head 54 and a recording head (magnetic recording head) 58 formed by a thin-film process at the trailing end 42b of the slider 42. Thus, the head portion 44 is formed as a separation type of magnetic head. The reading head 54 and the recording head 58 are covered by a protective insulating film 76 excluding the portions exposed to the ABS 43 of the slider 42. The protective insulating film 76 forms the outer shape of the head portion 44.

The reading head 54 comprises a magnetic film 55 having a magnetoresistive effect, and shield films 56 and 57 provided on the trailing and leading sides of the magnetic film 55 so as to sandwich the magnetic film 55. The lower ends of the magnetic film 55 and the shield films 56 and 57 are exposed to the ABS 43 of the slider 42.

Figure 5:
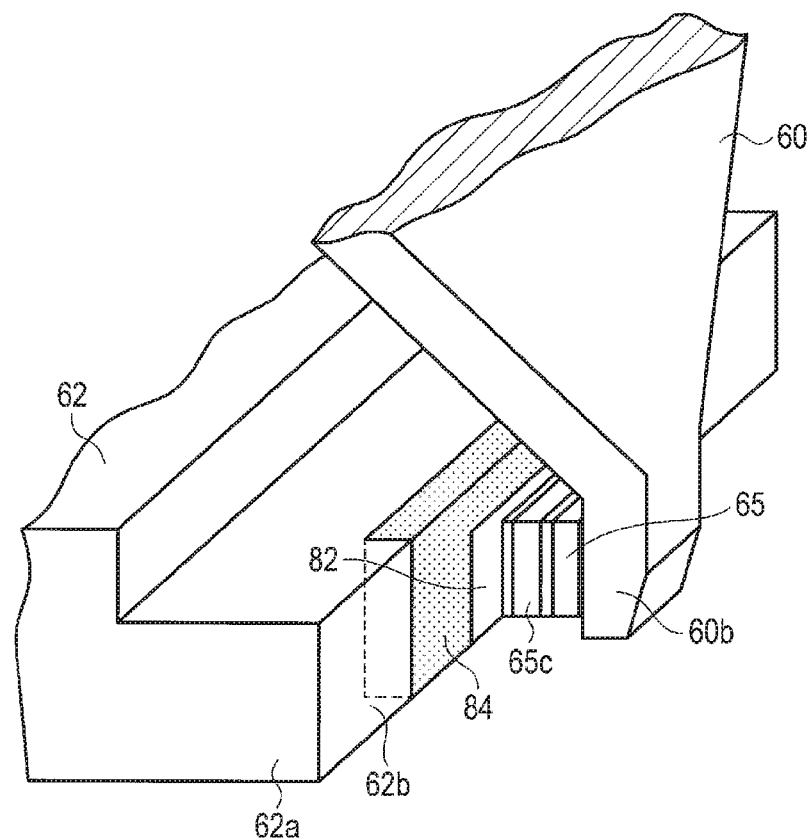
FIG. 5 is an enlarged perspective view showing an ABS-side end portion of the recording head.
Figure 4:
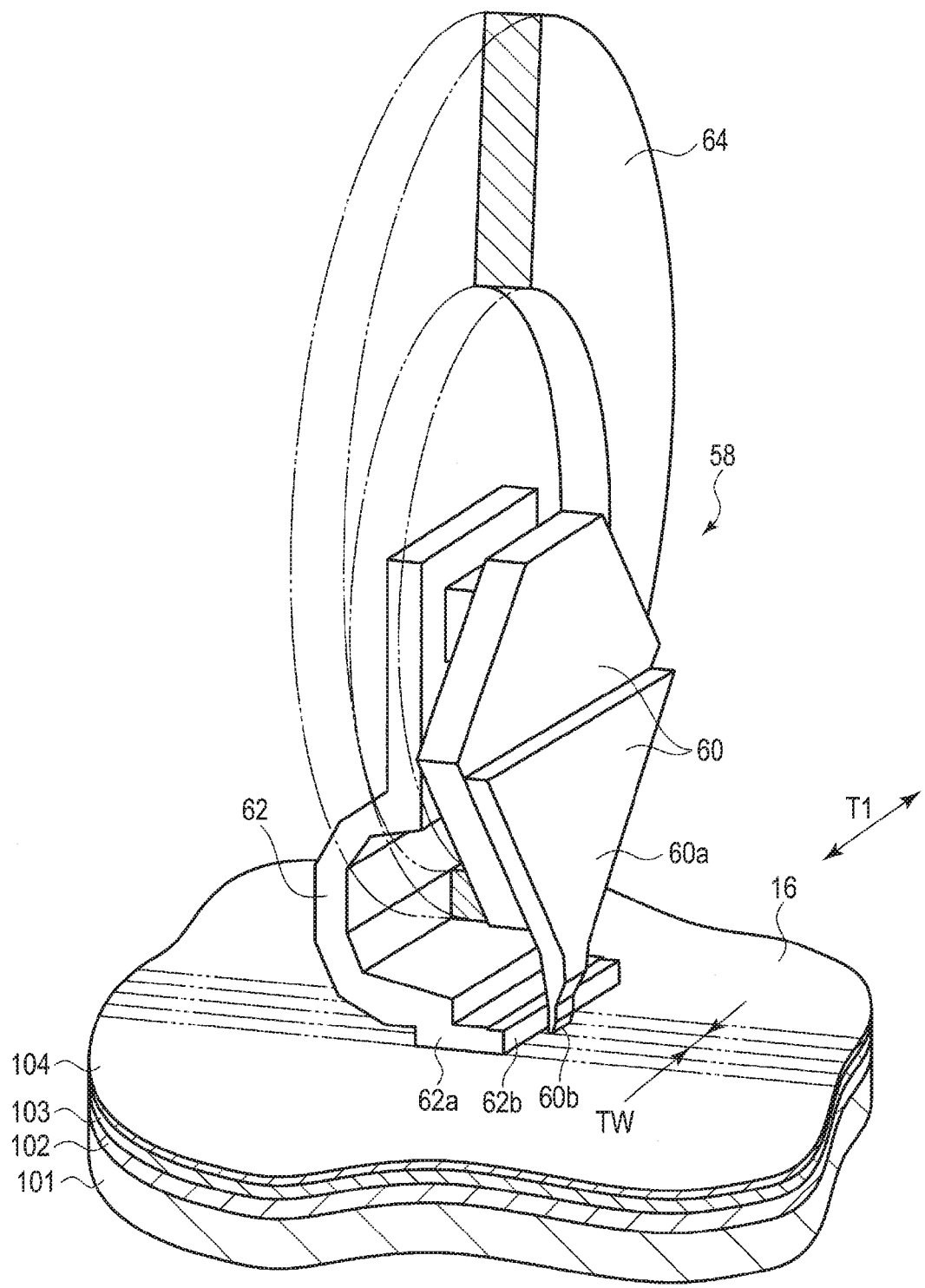
FIG. 4 is a perspective view schematically showing a recording head of the magnetic head.
Figure 6:
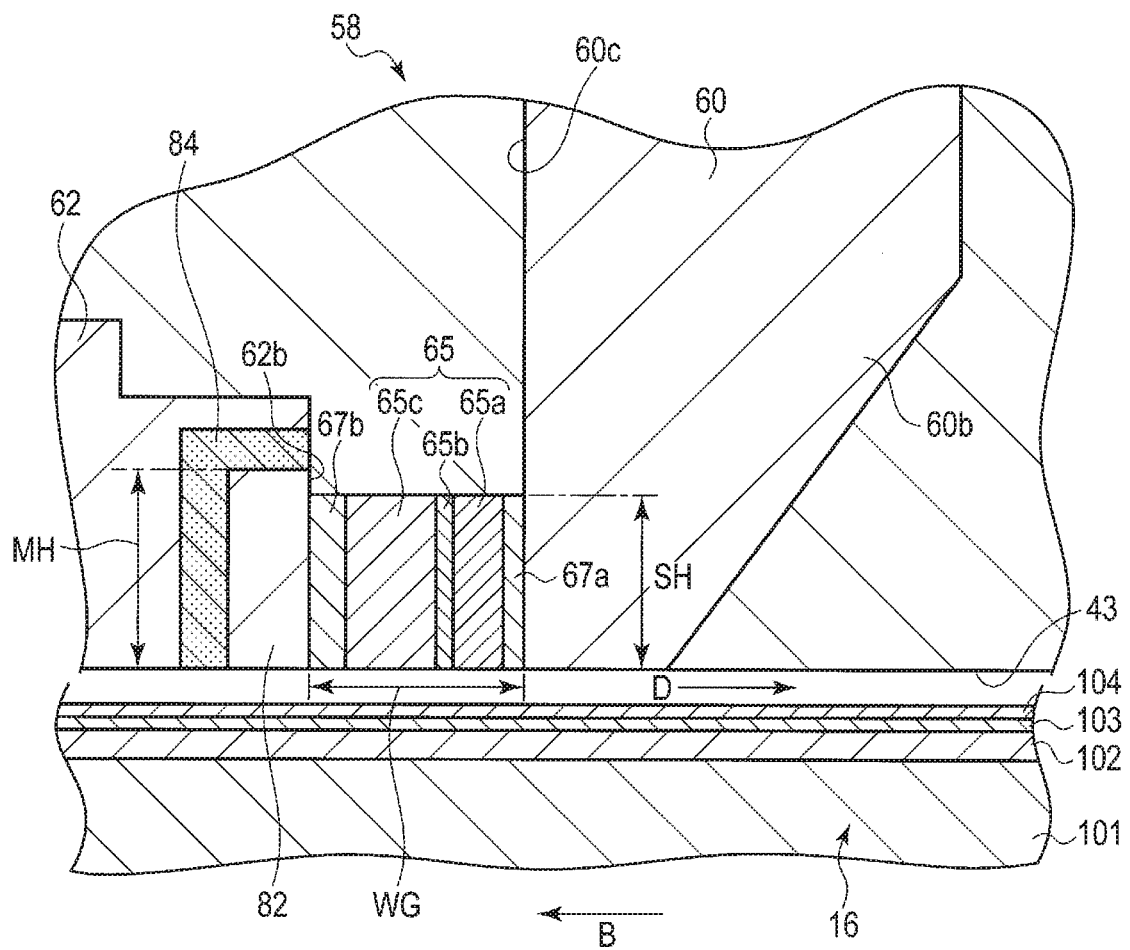
FIG. 6 is an enlarged cross-sectional view taken along a track center and showing the ABS-side end portion of the recording head.
Figure 7:
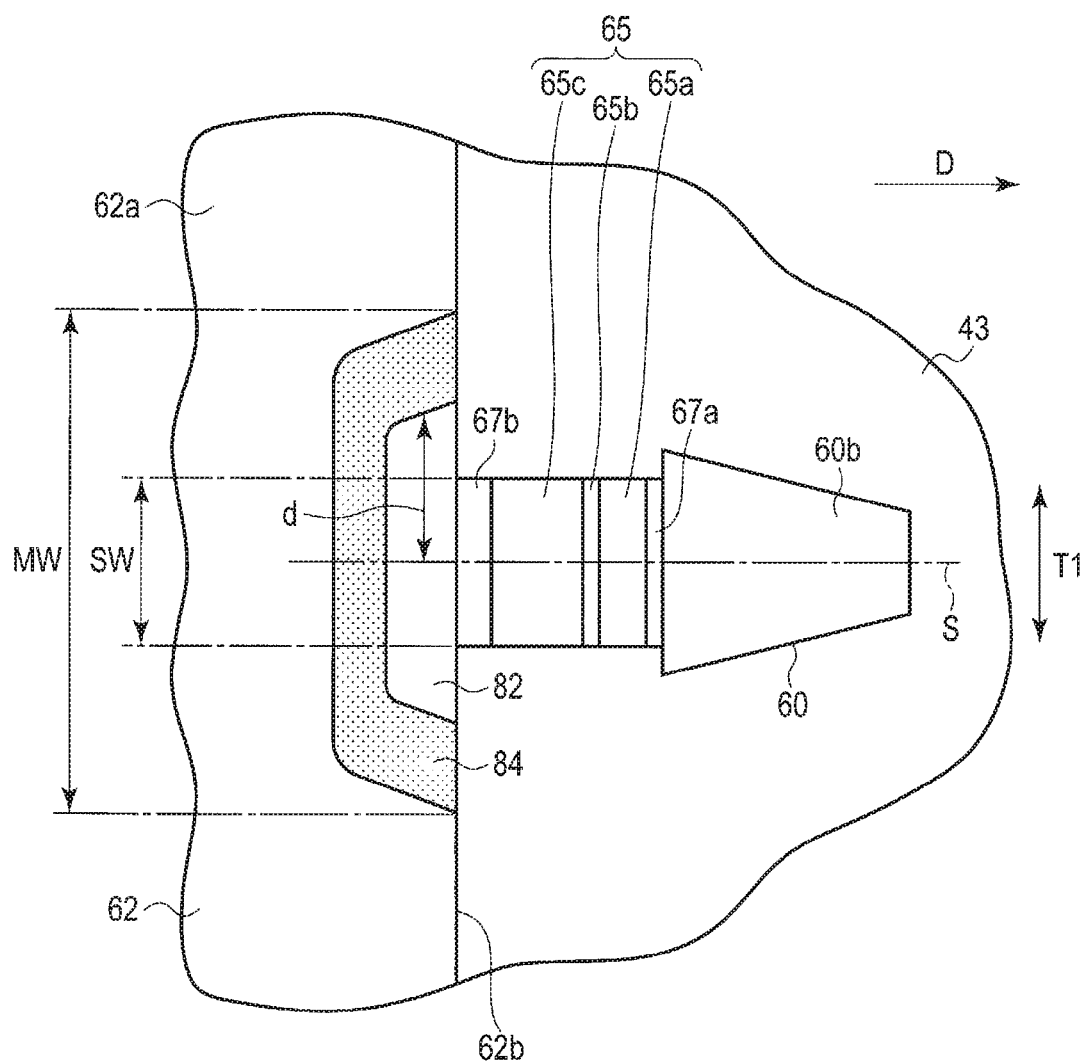
FIG. 7 is an enlarged plan view showing the ABS-side end portion of the recording head when viewed from the ABS side.

The recording head 58 is provided on the trailing end 42b side of the slider 42 relative to the reading head 54. FIG. 4 is a perspective view schematically showing the recording head 58 and the magnetic disk 16. FIG. 5 is an enlarged perspective view showing the ABS-side end portion of the recording head 58. FIG. 6 is an enlarged cross-sectional view taken along the track center and showing the end portion of the recording head 58 on the magnetic disk 16 side. FIG. 7 is an enlarged perspective view showing the end portion of the recording head 58 on the magnetic disk 16 side.

As shown in FIG. 3 to FIG. 6, the recording head 58 comprises: a main magnetic pole 60 which is formed of a soft magnetic material and a high-saturated magnetized material producing a recording magnetic field in a direction perpendicular to the surface of the magnetic disk 16; a trailing shield (write shield) 62 which is provided on the trailing side of the main magnetic pole 60 to effectively close the magnetic path via the soft magnetic layer 102 immediately under the main magnetic pole 60, and is formed of a soft magnetic material; a recording coil 64 which winds around a magnetic core (magnetic circuit) including the main magnetic pole 60 and the trailing shield 62, and is provided to supply a magnetic flux to the main magnetic pole 60 when a signal is written to the magnetic disk 16; and a high-frequency (microwave) oscillator, for example, a spin torque oscillator (STO) 65 which is formed of a nonmagnetic conductive material and is provided in the portion facing the ABS 43 between an apical end portion 60b of the main magnetic pole 60 on the ABS 43 side and the trailing shield 62.

The main magnetic pole 60 extends substantially perpendicularly to the surface of the magnetic disk 16 and the ABS 43. The lower end portion of the main magnetic pole 60 on the ABS 43 side comprises a tapered portion 60a and the apical end portion 60b. The tapered portion 60a tapers towards the ABS 43 and narrows down into a funnel shape in the track width direction. The apical end portion 60b extends from the tapered portion 60a to the ABS 43 and has a predetermined width. The distal end, in other words, the lower end of the apical end portion 60b is exposed to the ABS 43 of the magnetic head. The width of the apical end portion 60b in the track width direction T1 substantially corresponds to the track width TW in the magnetic disk 16. The main magnetic pole 60 extends substantially perpendicularly to the ABS 43 and comprises a shield-side end surface 60c facing the trailing side.

The trailing shield 62 has substantially an L-shape. The trailing shield 62 comprises an apical end portion 62a facing the apical end portion 60b of the main magnetic pole 60 across an intervening write gap, and a connection portion (back gap portion) 50 which is away from the ABS 43 and is connected to the main magnetic pole 60. The connection portion 50 is connected to the upper portion of the main magnetic pole 60, in other words, to the upper portion away from the ABS 43 toward the deep side or the upper side, via a nonconductive element 52.

The apical end portion 62a of the trailing shield 62 has the shape of a slender rectangle. The lower end surface of the trailing shield 62 is exposed to the ABS 43 of the slider 42. A leading-side end surface (main-magnetic-pole-side end surface) 62b of the apical end portion 62a extends substantially perpendicularly to the ABS 43 and extends in the track width direction of the magnetic disk 16. The leading-side end surface 62b faces the shield-side end surface 60c of the main magnetic pole 60 substantially parallel across an intervening write gap WG in the lower end portion of the main magnetic pole 60 (in other words, in a part of the apical end portion 60b and the tapered portion 60a).

As shown in FIG. 5, FIG. 6 and FIG. 7, the STO 65 is provided between the apical end portion 60b of the main magnetic pole 60 and the trailing shield 62 in the write gap WG, and is partially exposed to the ABS 43. The STO 65 comprises a spin injection layer 65a, an intermediate layer (nonmagnetic conductive layer) 65b and an oscillation layer 65c, and is structured by stacking these layers in order from the main magnetic pole 60 side to the trailing shield 62 side, in other words, in a direction opposite to the travel direction D of the magnetic head 17. The spin injection layer 65a is attached to the shield-side end surface 60c of the main magnetic pole 60 via a nonmagnetic conductive layer (foundation layer) 67a. The oscillation layer 65c is attached to the leading-side end surface 62b of the trailing shield 62 via a nonmagnetic conductive layer (cap layer) 67b. The stacking order of the spin injection layer 65a, the intermediate layer 65b and the oscillation layer 65c may be opposite to the above order. In other words, these layers may be stacked in order from the trailing shield 62 side to the main magnetic pole 60 side.

Each of the spin injection layer 65a, the intermediate layer 65b and the oscillation layer 65c comprises a stack surface or a film surface extending in a direction intersecting with the ABS 43, for example, in a direction perpendicular to the ABS 43. The lower end surface of the STO 65 is exposed to the ABS 43 and is formed as the same plane as the ABS 43. Width SW of the STO 65 is set so as to be substantially equal to or less than the track width TW. Height SH of the STO 65 (the height in a direction perpendicular to the ABS 43) is substantially equal to or less than the height of the leading-side end surface 62b of the trailing shield 62. Width SW and height SH of the STO 65 are set to, for example, approximately 40 nm.

In at least one of the trailing shield 62 and the main magnetic pole 60 included in the magnetic core, a magnetic layer 82 formed of a high-magnetic-permeability material is provided in the area facing the STO 65. Further, a nonmagnetic layer 84 is provided outside the magnetic layer 82. Magnetic microparticles are dispersed in the nonmagnetic material layer 84.

As shown in FIG. 5, FIG. 6 and FIG. 7, in the present embodiment, the magnetic layer 82 is provided in the apical end portion of the trailing shield 62. For example, the magnetic layer 82 has substantially a rectangular shape, and is exposed to the leading-side end surface 62b and the ABS 43. The side surfaces and the bottom surface of the magnetic layer 82 constitute a part of the leading-side end surface 62b and a part of the ABS 43.

The area of the opposite surface of the magnetic layer 82 facing the STO 65, in other words, the area of the magnetic layer 82 exposed to the leading-side end surface 62b, is formed so as to be greater than that of the opposite surface (film surface) of the oscillation layer 65c. For example, on the leading-side end surface 62b, height MH of the magnetic layer 82 (in other words, the height from the ABS 43 in the depth direction) is formed so as to be greater than height SH of the STO 65. On the leading-side end surface 62b, width MW of the magnetic layer 82 (in other words, the width in the track width direction T1) is formed so as to be greater than width SW of the STO 65. In the track width direction T1, distance d from the track center S to the side edge of the magnetic layer 82 is formed so as to be greater than or equal to a half-width SW of the STO 65 (SW/2). Thus, the magnetic layer 82 faces the entire part of the stack surface of the STO 65 and extends to both sides of the STO 65 upward and in the width direction beyond the side edges of the STO 65.

The thickness of the magnetic layer 82, in other words, the thickness in a direction perpendicular to the film surface of the STO 65, is arbitrarily adjustable.

The nonmagnetic layer (granular magnetic layer) 84 is provided outside the magnetic layer 82 and covers the circumference of the magnetic layer 82. The nonmagnetic layer 84 is stacked on the back surface of the magnetic layer 82 on the trailing side (in other words, the surface on a side opposite to the STO 65 side), the upper surface of the magnetic layer 82 and the both side surfaces of the magnetic layer 82 in the track width direction. The nonmagnetic layer 84 is exposed to the leading-side end surface 62b and the ABS 43. The side surfaces and the bottom surface of the magnetic layer 82 constitute a part of the leading-side end surface 62b and a part of the ABS 43.

The nonmagnetic layer 84 formed in the above manner comprises a nonmagnetic material such as alumina (Al2O3) or ruthenium (Ru). Magnetic microparticles formed of an alloy containing Co, Fe, Ni, etc., are dispersed in the nonmagnetic layer 84 substantially uniformly. The diameter of magnetic microparticles is preferably several tens of nanometers to several micrometers. The contained amount (concentration) of magnetic microparticles is preferably approximately 5 to 25% per unit volume. By controlling the contained amount of magnetic microparticles, the nonmagnetic properties of the nonmagnetic layer 84 can be adjusted. The thickness of the nonmagnetic layer 84 can be arbitrarily adjusted.

As shown in FIG. 3, the main magnetic pole 60 and the trailing shield 62 are connected to a power source 74 via an interconnection 66 and connection terminals (current terminals) 70 and 72. A current circuit is structured such that current Iop is supplied from the power source 74 to the interconnection 66, the main magnetic pole 60, the STO 65 and the trailing shield 62 in series.

For example, the recording coil 64 winds around the connection portion 50 between the main magnetic pole 60 and the trailing shield 62. The recording coil 64 is connected to a terminal 78 via an interconnection 77. A second power source 80 is connected to the terminal 78. Recording current Iw supplied from the second power source 80 to the recording coil 64 is controlled by the control unit of the HDD. When a signal is written to the magnetic disk 16, a predetermined recording current Iw is supplied from the second power source 80 to the recording coil 64. A magnetic flux is supplied to the main magnetic pole 60, thereby producing a recording magnetic field.

According to the HDD structured in the above manner, when the VCM 24 is driven, the carriage assembly 22 is rotated. The magnetic head 17 is moved onto the desired track of the magnetic disk 16, and the position of the magnetic head 17 is determined. As shown in FIG. 2, the magnetic head 17 is caused to fly by the air flow C produced between the disk surface and the ABS 43 because of the rotation of the magnetic disk 16. When the HDD is operated, the ABS 43 of the slider 42 faces the disk surface, maintaining a space from the disk surface. In this state, recording data is read from the magnetic disk 16 by the reading head 54, and further, data is written to the magnetic disk 16 by the recording head 58.

In writing data, as shown in FIG. 3, direct current is supplied from the power source 74 to the main magnetic pole 60, the STO 65 and the trailing shield 62. Thus, a high-frequency magnetic field (microwave) is produced from the STO 65. This high-frequency magnetic field is applied to the magnetic recording layer 103 of the magnetic disk 16. Alternating current is supplied from the power source 80 to the recording coil 64, and thus, the main magnetic pole 60 is excited by the recording coil 64. From the main magnetic pole 60, a recording magnetic field is perpendicularly applied to the recording layer 103 of the magnetic disk 16 immediately under the main magnetic pole 60. In this manner, data is recorded in the magnetic recording layer 103 with a desired track width. By superimposing a high-frequency magnetic field on the recording magnetic field, the magnetization inversion of the magnetic recording layer 103 is stimulated. Thus, it is possible to perform magnetic recording of a high-magnetic-anisotropy energy. By supplying current from the main magnetic pole 60 to the trailing shield 62, the disorder in the magnetic domain of the main magnetic pole 60 can be eliminated. Thus, an efficient magnetic path can be obtained. The magnetic field produced from the apical end of the main magnetic pole 60 is enhanced.

In the above embodiment, in the recording head 58, the magnetic layer 82 formed of a high-magnetic-permeability material is provided on the pole surface facing the STO 65. Further, in the recording head 58, the granular magnetic layer formed of the nonmagnetic layer 84 containing magnetic microparticles is provided so as to be in contact with an external side of the magnetic layer 82 different from the STO 65 side. In this manner, the spin wave produced from the STO 65 is blocked by the nonmagnetic layer (granular magnetic layer) 84, and is not transferred beyond the nonmagnetic layer 84. Thus, the rotation of magnetization (spin wave) on the opposite surface facing the STO 65 in the magnetic core is restricted. Thus, the rotation of magnetization of the STO 65 becomes excellent as it is not disturbed by the above spin wave. In this manner, the oscillation magnetic field of the STO 65 is increased. At the same time, it is possible to prevent blurring of writing in the recording magnetic field, the recording saturation on the trailing shield 62 side and the fringe magnetic field by providing the magnetic layer 82 formed of a high-magnetic-permeability material on the surface (leading-side end surface 62b) of the trailing shield 62 facing the STO 65.

By providing the granular magnetic layer (nonmagnetic layer 84), the transmission of spin wave is restricted, and thus, the effect of magnetic field assist of the high-frequency-assisted element (STO 65) is increased. In this manner, the recording performance of the recording head is enhanced, thereby improving the recording density. Further, the track density can be improved by the effect of prevention of recording saturation or the effect of fringe prevention because of the magnetic layer 82 provided on the opposite surface of the trailing shield 62 facing the STO 65. Thus, the areal density of the HDD can be improved.

Figure 8:
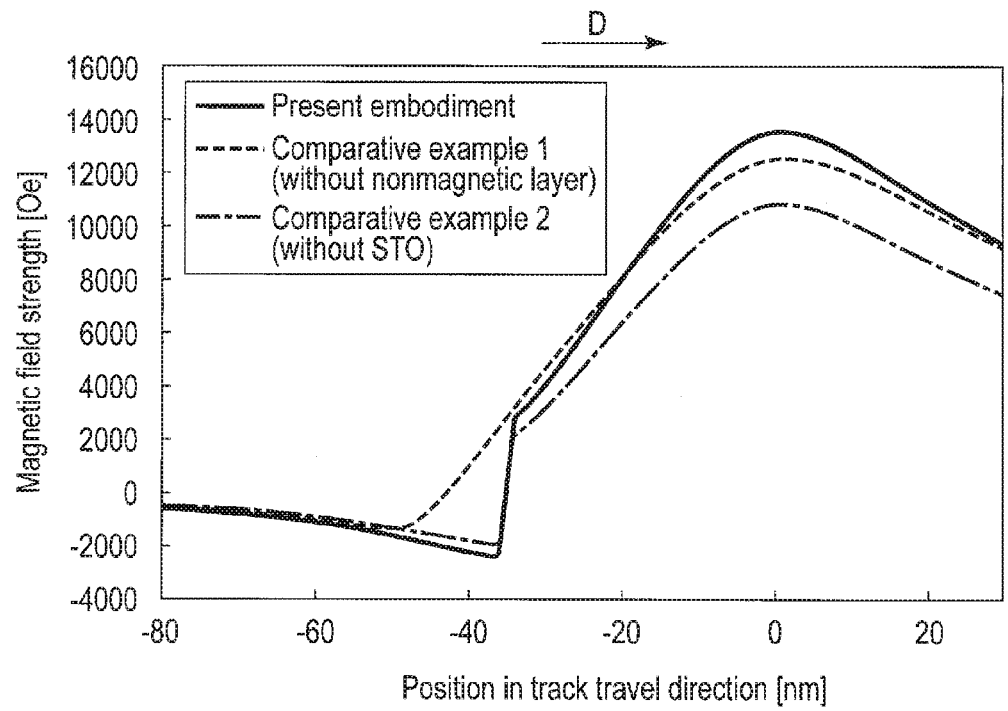
FIG. 8 shows a comparison between the magnetic recording head of the present embodiment, the magnetic recording head of comparative example 1 and the magnetic recording head of comparative example 2 with respect to the distribution of the magnetic field strength in the track travel direction.

FIG. 8 shows the distribution of magnetic field in the head travel direction in the track center and in the vicinity immediately under the write gap with respect to the magnetic head of the present embodiment, a conventional magnetic head which does not comprise a magnetic layer or a nonmagnetic layer (comparative example 1) and a magnetic head without an STO (comparative example 2). This figure shows that the maximum magnetic field strength is increased in the magnetic head comprising an STO in comparative example 1 in comparison with the magnetic head which does not have an STO in comparative example 2. However, in the magnetic head of comparative example 1, since a spin wave is produced in the trailing shield 62, the magnetic field gradient is decreased, and thus, the recording resolution is reduced. The magnetic head of the present embodiment produces no loss in the magnetic field rotation in the trailing shield 62. Thus, both the magnetic field strength and the magnetic field gradient are increased.

Figure 9:
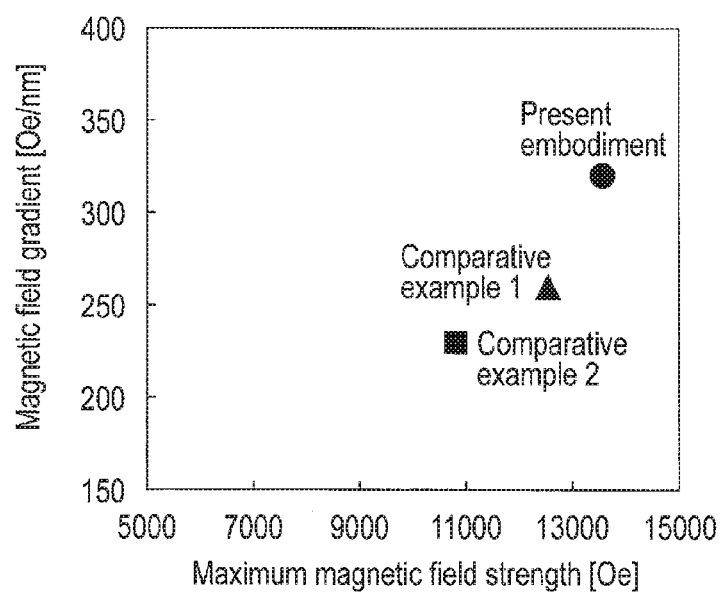
FIG. 9 shows a comparison between the magnetic recording head of the present embodiment, the magnetic recording head of comparative example 1 and the magnetic recording head of comparative example 2 with respect to the relationship between the maximum magnetic field strength and the magnetic field gradient.

FIG. 9 shows the relationship between the maximum magnetic field strength and the magnetic field gradient on the trailing side of the main magnetic pole when the magnetic heads of the present embodiment and comparative examples 1 and 2 are used. This figure shows that both the magnetic field strength and the magnetic field gradient are increased in the magnetic head of the present embodiment in comparison with the magnetic heads of comparative examples 1 and 2.

Figure 10:
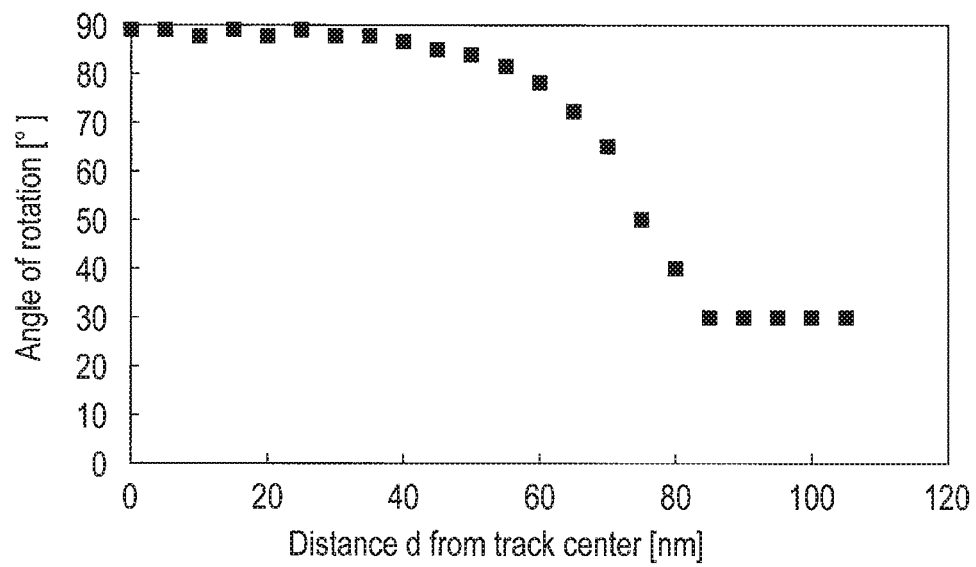
FIG. 10 shows the relationship between distance d from the track center of the magnetic head to a nonmagnetic layer and the angle of rotation of magnetization from the film surface of a high-frequency oscillator.

FIG. 10 shows the relationship between distance d from the track center of the magnetic head to the nonmagnetic layer 84 in FIG. 7 and the angle of rotation of magnetization from the film surface of the STO 65. When the nonmagnetic layer 84 is provided near the STO 65, in other words, when distance d is less, the spin wave is not transferred to the trailing shield 62. Thus, the rotation of magnetization of the STO 65 is large around the axis perpendicular to the film surface. In this manner, the STO 65 exhibits good oscillation. When distance d is increased, and the nonmagnetic layer 84 is located remote from the STO 65, a spin wave is produced, and thus, the angle of rotation of magnetization of the STO 65 is decreased. The STO 65 does not exhibit good oscillation. In the example shown in FIG. 10, the state of oscillation of the STO 65 is good when distance d is in the range of 20 to 80 nm.

Figure 11:
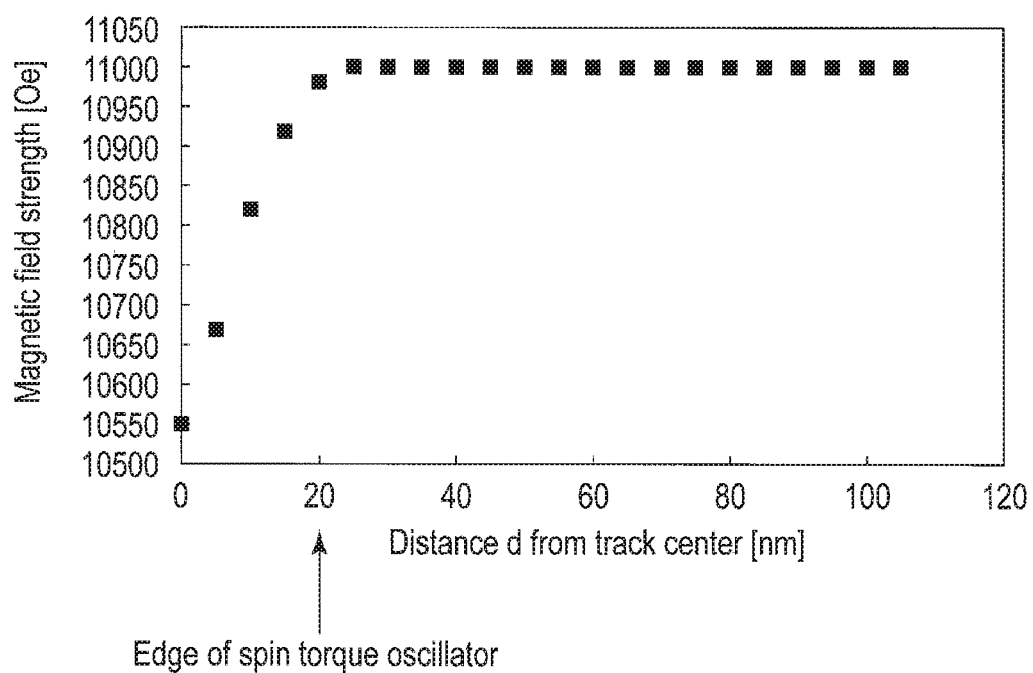
FIG. 11 shows the relationship between distance d and the maximum magnetic field strength of the magnetic head.

FIG. 11 shows the relationship between distance d and the maximum magnetic field strength of the magnetic head. When distance d is less (for example, less than or equal to 20 nm), in other words, when the nonmagnetic layer 84 in which magnetic microparticles are dispersed is provided on the leading-side end surface 62b of the trailing shield 62 facing the STO 65, the amount of magnetic field intrusion from the main magnetic pole 60 to the trailing shield 62 is decreased. Thus, the magnetic field strength is decreased.

FIG. 10 and FIG. 11 show that it is possible to obtain both a sufficient magnetic field strength and a sufficient angle of rotation of the STO by providing the nonmagnetic layer 84 outside the side edge of the STO 65 on the leading-side end surface 62b, specifically, by setting distance d to approximately 20 to 80 nm in the examples of the figures. Distance d is preferably greater than the distance (for example, 20 nm) from the track center to the side edge of the STO 65, and less than approximately the four times (80 nm) the distance from the track center to the side edge of the STO 65. The distance (MH-SH) from the upper edge of the STO 65 to the nonmagnetic layer 84 in the height direction is preferably set to, for example, approximately 5 to 60 nm.

Figure 12:
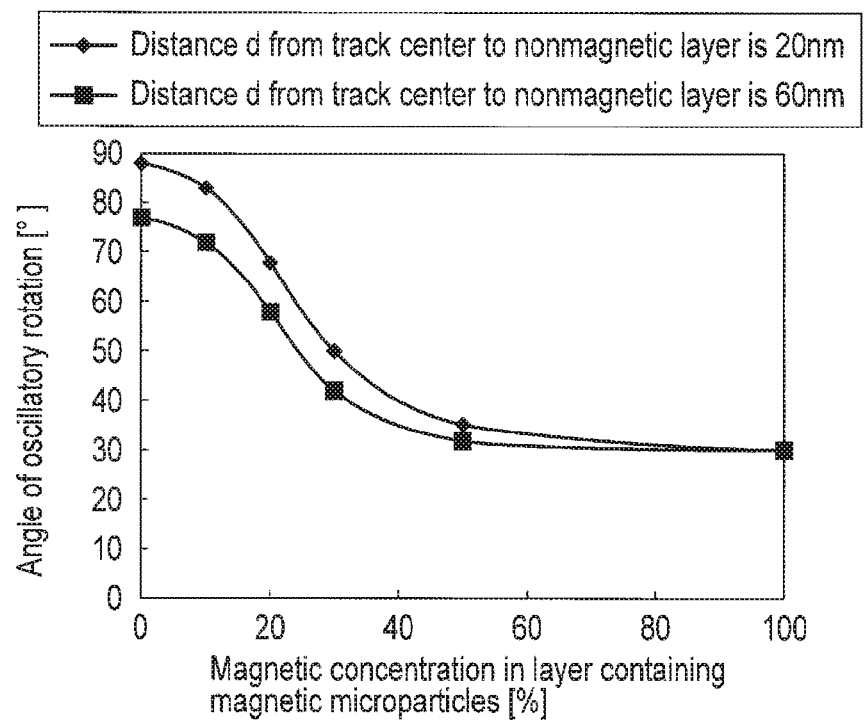
FIG. 12 shows the relationship between the concentration of magnetic microparticles and the angle of oscillatory rotation of the high-frequency oscillator when distance d is 20 nm and 60 nm.
Figure 13:
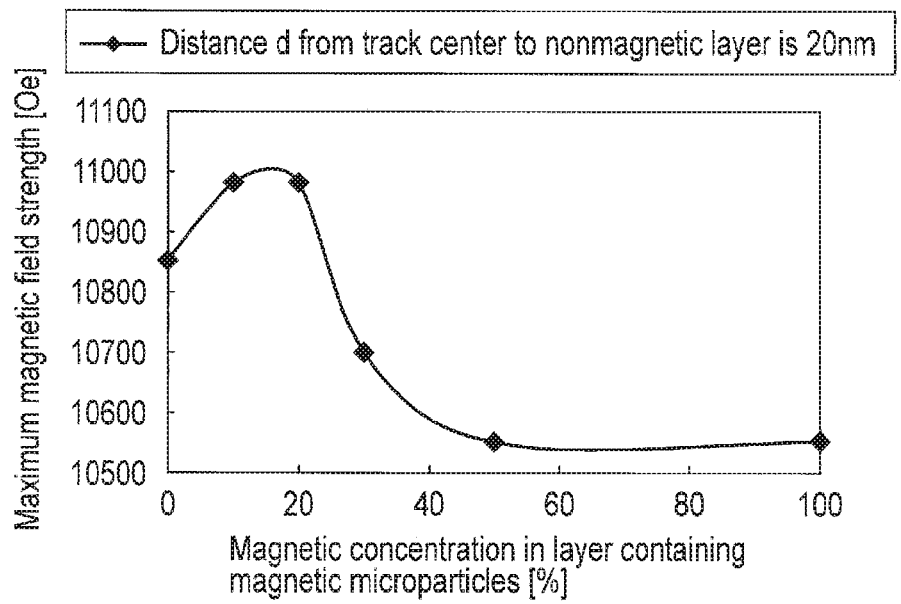
FIG. 13 shows the relationship between the concentration of magnetic microparticles and the maximum magnetic field strength when distance d is 20 nm.

FIG. 12 shows the relationship between the concentration (%; contained amount) of magnetic microparticles in the nonmagnetic layer 84 and the angle of oscillatory rotation of the STO 65 when distance d from the track center is 20 nm and 60 nm. FIG. 13 shows the relationship between the concentration (%; contained amount) of magnetic microparticles in the nonmagnetic layer 84 and the maximum magnetic field strength of the magnetic head when distance d from the track center is 20 nm.

FIG. 12 shows that, either when distance d is 20 nm or 60 nm, the angle of oscillatory rotation of the STO 65 is increased as the concentration of magnetic microparticles is decreased, and further, the angle of oscillatory rotation is less at 30° with a concentration over approximately 50%. FIG. 13 shows that the magnetic field strength is the greatest when the concentration of magnetic microparticles is in the range of approximately 5 to 25%. When the concentration exceeds 40%, the magnetic field strength is decreased. In consideration of the above factors, to obtain both a large angle of oscillatory rotation and a high magnetic field strength, the concentration of magnetic microparticles in the nonmagnetic layer 84 is preferably approximately 5 to 25%, and further preferably approximately 10 to 20%.

As explained above, in the HDD and the magnetic head in the present embodiment, the nonmagnetic layer (granular magnetic layer) containing magnetic microparticles is provided outside the magnetic layer facing the STO. With this structure, the spin wave in the trailing shield 62 is produced only near the write gap surface (leading-side end surface) of the trailing shield 62 and is not transferred to the deep side of the trailing shield 62. Thus, the rotation of magnetization of the oscillation layer of the STO 65 is not affected by the spin wave, and thus, an excellent rotation of magnetization can be obtained. The recording magnetic field produced from the main magnetic pole 60 can prevent the magnetization saturation of the trailing shield 62 and secure a sufficient magnetic field gradient, using the magnetic layer 82 which is formed of a high-magnetic-permeability material and is provided on the opposite surface of the magnetic core facing the STO 65. In this manner, the recording line density can be improved.

In the above manner, the present embodiment can provide a magnetic recording head realizing stable high-frequency assist and high recording density, and a disk device comprising the magnetic recording head.

The following is a description of magnetic recording heads of HDDs according to alternative embodiments. In the following description of the alternative embodiments, like reference numbers are used to designate the same elements as those of the first embodiment, and a detailed description thereof is omitted or simplified. Elements different from those of the first embodiment are mainly explained in detail.

Second Embodiment

Figure 14:
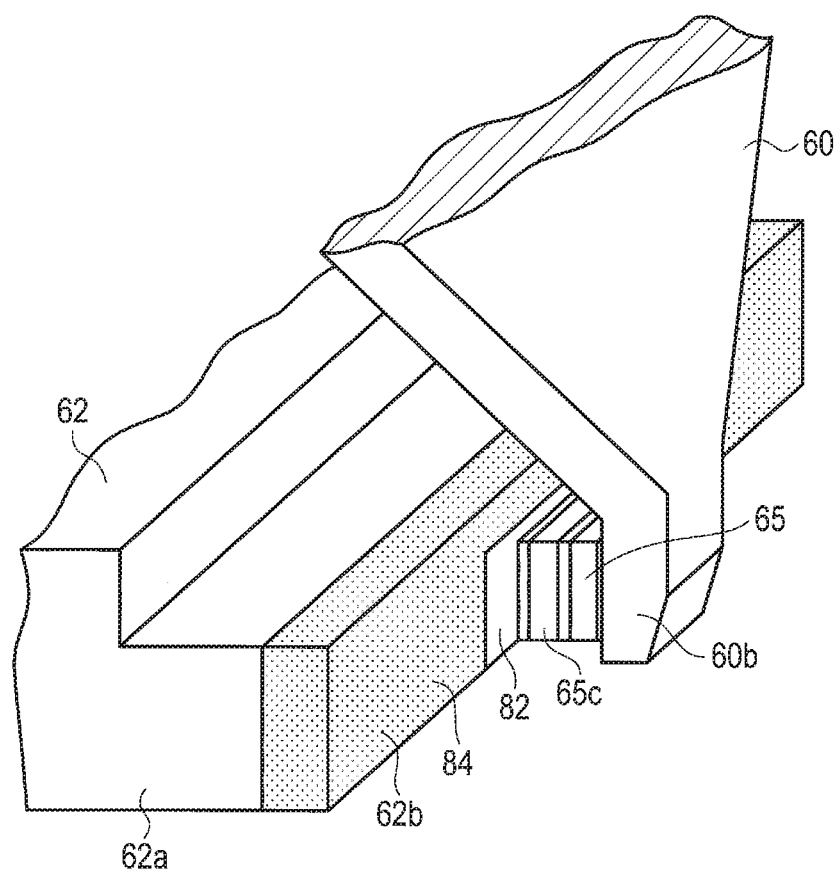
FIG. 14 is an enlarged perspective view schematically showing the apical end portion of a magnetic recording head in an HDD according to a second embodiment.

FIG. 14 is an enlarged perspective view schematically showing the apical end portion of a magnetic recording head in an HDD according to a second embodiment. FIG. 15 is a plan view showing the apical end portion of the magnetic recording head when viewed from the ABS side. As shown in FIG. 14 and FIG. 15, a magnetic layer 82 formed of a high-magnetic-permeability material is provided on a leading-side end surface 62b of a trailing shield 62, and faces an STO 65. Further, a nonmagnetic layer 84 is provided outside the magnetic layer 82 in the leading-side end portion of the trailing shield 62. Magnetic microparticles are dispersed in the entire part of the nonmagnetic layer 84 substantially uniformly. In the second embodiment, the nonmagnetic layer 84 is allocated on the entire surface of the leading-side end surface 62b of the trailing shield 62 in the width direction excluding the portion of the magnetic layer 82 facing the STO 65.

In the second embodiment, the other structures of the HDD are the same as those of the first embodiment.

Third Embodiment

FIG. 16 is an enlarged perspective view schematically showing the apical end portion of a magnetic recording head in an HDD according to a third embodiment. FIG. 17 is a plan view showing the apical end portion of the magnetic recording head when viewed from the ABS side. As shown in FIG. 16 and FIG. 17, a magnetic layer 82 formed of a high-magnetic-permeability material is provided on a leading-side end surface 62b of a trailing shield 62, and faces an STO 65. Further, in the leading-side end portion of the trailing shield 62, a pair of nonmagnetic layers 84a and 84b in which magnetic microparticles are dispersed substantially uniformly are provided outside the magnetic layer 82, here, on both sides of the magnetic layer 82 in the track width direction. The back surface side of the magnetic layer 82 is connected to the trailing shield 62. The magnetic layer 82 is formed integrally with the trailing shield 62.

The pair of nonmagnetic layers 84a and 84b are exposed to the leading-side end surface 62b and the upper surface of the trailing shield 62 and the ABS. Distance d from the track center S to the nonmagnetic layers 84a and 84b is set so as to be greater than half the width of the STO 65 in the track width direction, and is set to, for example, approximately 20 to 80 nm.

In the third embodiment, the other structures of the HDD are the same as those of the first embodiment.

Fourth Embodiment

Figure 18:
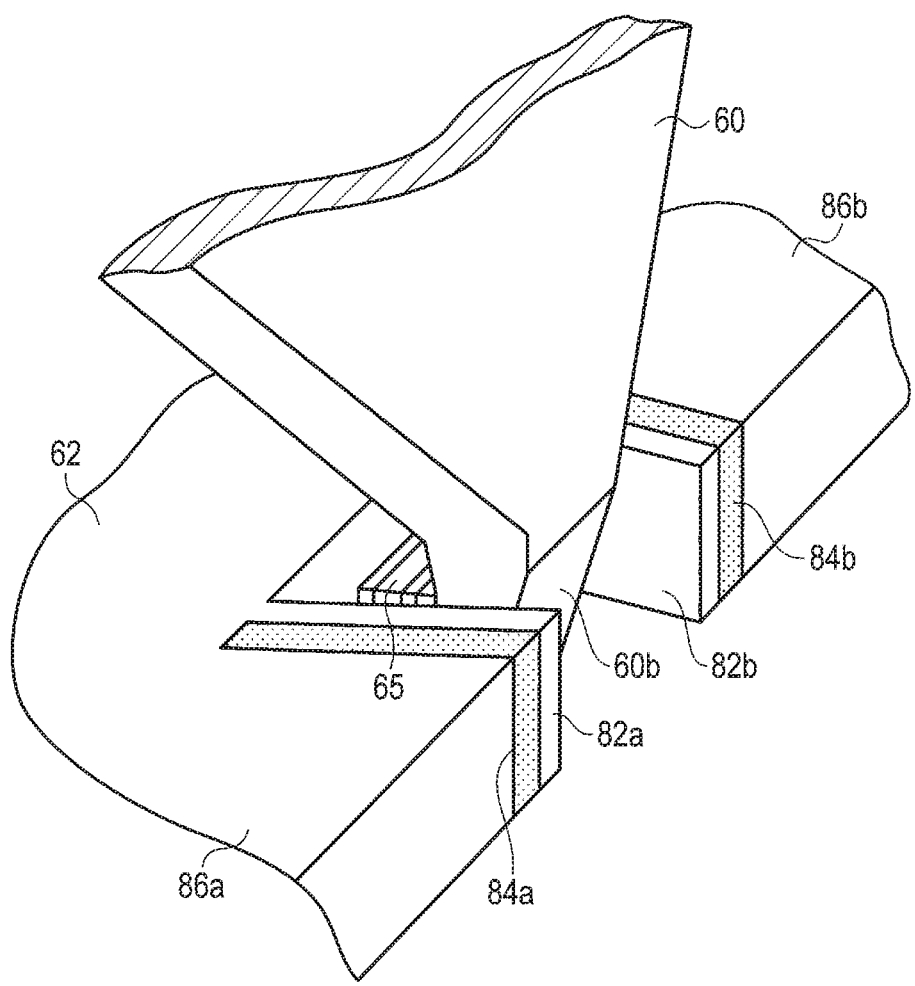
FIG. 18 is an enlarged perspective view schematically showing the apical end portion of a magnetic recording head in an HDD according to a fourth embodiment.
Figure 19:
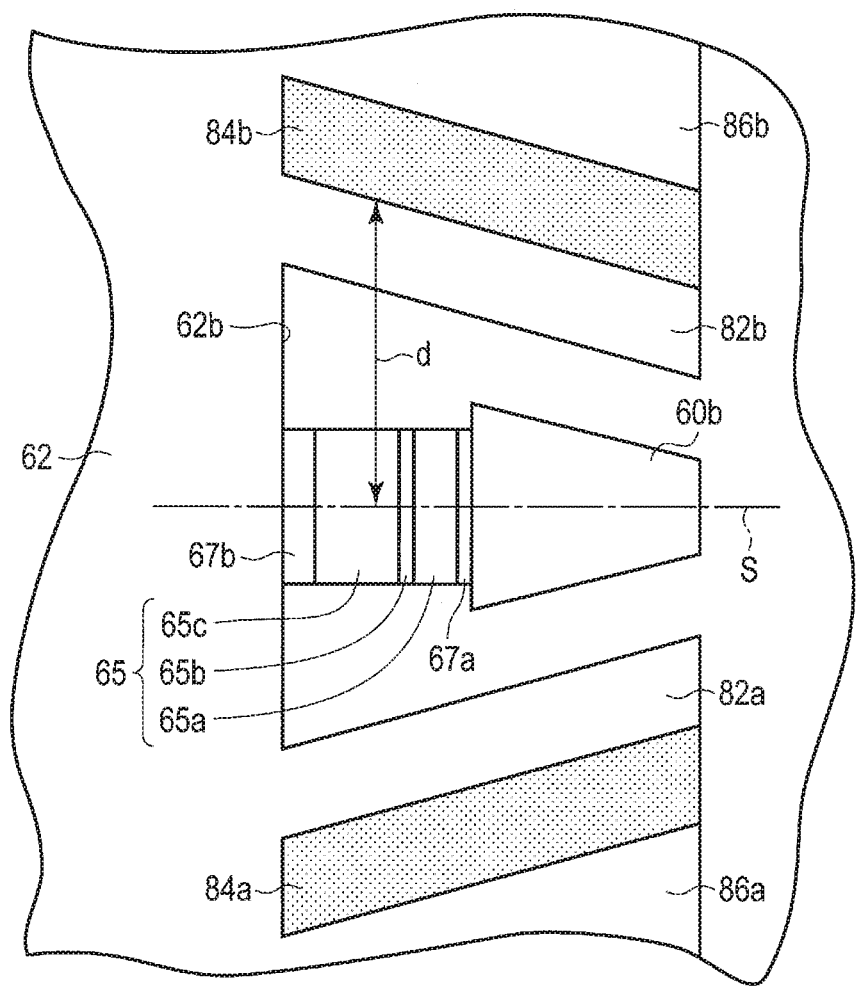
FIG. 19 is a plan view showing the apical end portion of the magnetic recording head when viewed from the ABS side according to the fourth embodiment.

FIG. 18 is an enlarged perspective view schematically showing the apical end portion of a magnetic recording head in an HDD according to a fourth embodiment. FIG. 19 is a plan view showing the apical end portion of the magnetic recording head when viewed from the ABS side. As shown in FIG. 18 and FIG. 19, in the present embodiment, the magnetic core of the magnetic recording head comprises a pair of side shields 86a and 86b formed of a soft magnetic material on both sides of a main magnetic pole 60 in the track width direction across intervening gaps. The side shields 86a and 86b are formed integrally with a trailing shield 62, and protrude from a leading-side end surface 62b of the trailing shield 62 to the leading side.

Magnetic layers 82a and 82b formed of a high-magnetic-permeability material are respectively provided on the opposite surfaces of the side shields 86a and 86b facing an STO 65, and face the STO 65. Further, in the side shields 86a and 86b, nonmagnetic layers 84a and 84b are provided outside the magnetic layers 82a and 82b relative to the STO 65, here, on the back surfaces of the magnetic layers 82a and 82b on sides opposite to the STO 65 side. Magnetic microparticles are dispersed in the nonmagnetic layers 84a and 84b substantially uniformly. The contained amount (concentration) of magnetic microparticles is the same as that of the first embodiment.

The pair of nonmagnetic layers 84a and 84b are exposed to the leading-side end surface and the upper surface of the side shields 86a and 86b, and the ABS. Distance d from the track center S to the nonmagnetic layers 84a and 84b is set so as to be greater than half the width of the STO 65 in the track width direction, and is set to, for example, approximately 60 to 80 nm.

In the fourth embodiment, the other structures of the HDD are the same as those of the first embodiment.

Fifth Embodiment

FIG. 20 is an enlarged perspective view schematically showing the apical end portion of a magnetic recording head in an HDD according to a fifth embodiment. FIG. 21 is a plan view showing the apical end portion of the magnetic recording head when viewed from the ABS side. As shown in FIG. 20 and FIG. 21, in the present embodiment, the magnetic core of the magnetic recording head comprises a pair of side shields 86a and 86b formed of a soft magnetic material on both sides of a main magnetic pole 60 in the track width direction across intervening gaps. The side shields 86a and 86b are formed integrally with a trailing shield 62, and protrude from a leading-side end surface 62b of the trailing shield 62 to the leading side.

Magnetic layers 82, 82a and 82b comprise a high-magnetic-permeability material, and are continuously formed on the leading-side end surface 62b of the trailing shield 62, and the opposite surfaces (facing an STO 65) of the side shields 86a, 86b located on both sides of the STO 65 in the width direction. The magnetic layers 82, 82a and 82b face the STO 65. Further, in the trailing shield 62 and the side shields 86a and 86b, nonmagnetic layers 84, 84a and 84b are continuously formed outside the magnetic layers 82, 82a and 82b relative to an STO 65, here, on the back surfaces of the magnetic layers 82, 82a and 82b on sides opposite to the STO 65 side. Magnetic microparticles are dispersed in the nonmagnetic layers 84, 84a and 84b substantially uniformly. The contained amount (concentration) of magnetic microparticles is the same as that of the first embodiment.

The nonmagnetic layers 84a and 84b are exposed to the leading-side end surfaces and the upper surfaces of the side shields 86a and 86b, respectively, and the ABS. The nonmagnetic layer 84 is exposed to the upper surface of the trailing shield 62 and the ABS. Distance d from the track center S to the nonmagnetic layers 84a and 84b is set so as to be greater than half the width of the STO 65 in the track width direction, and is set to, for example, approximately 60 to 80 nm. The distance from the STO 65 to the nonmagnetic layer 84, in other words, the thickness of the magnetic layer 82 is, for example, greater than or equal to 20 nm.

In the fifth embodiment, the other structures of the HDD are the same as those of the first embodiment.

Sixth Embodiment

Figure 22:
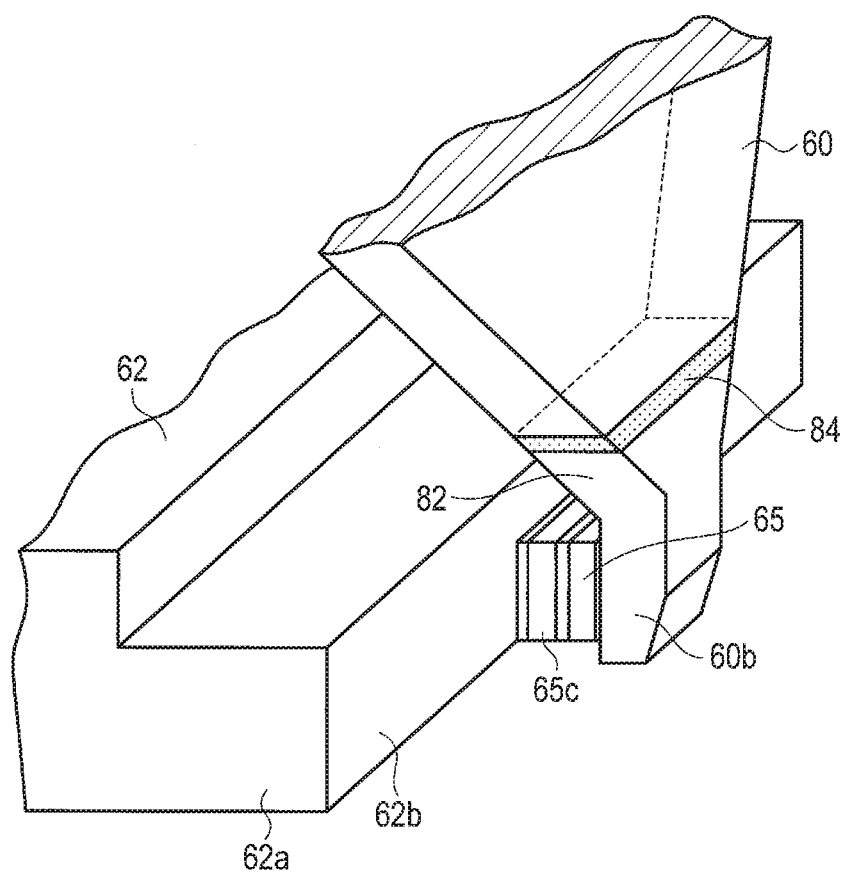
FIG. 22 is an enlarged perspective view schematically showing the apical end portion of a magnetic recording head in an HDD according to a sixth embodiment.

FIG. 22 is an enlarged perspective view schematically showing the apical end portion of a magnetic recording head in an HDD according to a sixth embodiment. In the present embodiment, in the magnetic core of the magnetic recording head, an apical end portion 60b of a main magnetic pole 60 is formed by a magnetic layer 82 comprising a high-magnetic-permeability material, and faces an STO 65. Further, in the main magnetic pole 60, a nonmagnetic layer 84 is provided outside the magnetic layer 82 relative to the STO 65, here, in a middle portion of the tapered portion of the main magnetic pole 60. Magnetic microparticles are dispersed in the nonmagnetic layer 84 substantially uniformly. The contained amount (concentration) of magnetic microparticles is the same as that of the first embodiment. In the present embodiment, the nonmagnetic layer 84 is provided parallel to the ABS, and is formed over the entire width and the entire thickness of the main magnetic pole 60. Further, the nonmagnetic layer 84 is away from the upper surface of the STO 65 by approximately 20 to 60 nm.

In the sixth embodiment, the other structures of the HDD are the same as those of the first embodiment.

In the second to sixth embodiments, an effect similar to that of the first embodiment can be obtained. Specifically, in addition to the first embodiment, in the second to sixth embodiments, it is possible to restrict the rotation of magnetization (spin wave) in the trailing shield 62, the side-shields 86a and 86b and/or the STO-facing surface of the main magnetic pole 60, using the nonmagnetic layers 84, 84a and 84b in which magnetic microparticles are dispersed. Thus, the rotation of magnetization of the STO 65 can be excellent. As a result, an effect of magnetic field assist applied to the magnetic disks from the STO 65 is increased. By improvement in the recording performance, the high recording density can be realized.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the sixth embodiment may be combined with any of the first to fifth embodiments. A nonmagnetic layer containing magnetic microparticles may be provided in both the trailing shield and the main magnetic pole. Alternatively, a nonmagnetic layer containing magnetic microparticles may be provided in both the side shield and the main magnetic pole. A nonmagnetic layer containing magnetic microparticles may be provided in the following three elements: the trailing shield; the side shield; and the main magnetic pole.

The materials and shapes of the magnetic layers and the nonmagnetic layers are not limited the above embodiments, and may be changed depending on the need. The materials, shapes and sizes of elements constituting the head portion of the magnetic head may be changed depending on the need. In the magnetic disk device, the number of magnetic disks and magnetic heads may be increased or decreased depending on the need. The size of magnetic disks may be selected in various ways.

What is claimed is:

1. A magnetic recording head comprising:
an air bearing surface;
a magnetic core comprising a main magnetic pole formed of a high-magnetic-permeability material and comprising an apical end portion extending to the air bearing surface; and a write shield formed of a high-magnetic-permeability material, the write shield being arranged to face the main magnetic pole through a nonconductive layer on a deep side apart from the air bearing surface, and to face the apical end portion of the main magnetic core on the air bearing surface side through a conductive nonmagnetic layer with a write gap;
a coil provided so as to pass across the magnetic core;
a high-frequency oscillator provided between the main magnetic pole and the write shield in the write gap; and
a pair of current terminals for supplying direct current between the main magnetic pole and the write shield, wherein
the magnetic core comprises an opposite surface facing a film surface of the high-frequency oscillator, a magnetic layer formed of a high-magnetic-permeability material, and a nonmagnetic layer in which magnetic microparticles are dispersed, the nonmagnetic layer being provided outside the magnetic layer in at least a part of the opposite surface of the magnetic core.

2. The magnetic recording head of claim 1, wherein
the write shield comprises an opposite surface facing the apical end portion of the main magnetic pole with the write gap being interposed,
the magnetic layer is exposed to the opposite surface of the write shield and faces the high-frequency oscillator, and
the nonmagnetic layer covers an opposite side of the magnetic layer relative to the high-frequency oscillator in the write shield.

3. The magnetic recording head of claim 2, wherein
the high-frequency oscillator comprises the film surface extending in a direction intersecting with the air bearing surface, the magnetic layer comprises an opposite surface facing the high-frequency oscillator, an area of the opposite surface of the magnetic layer is greater than an area of the film surface of the high-frequency oscillator, and
the nonmagnetic layer is away from an edge of the high-frequency oscillator.

4. The magnetic recording head of claim 1, wherein
the magnetic core comprises a side shield connected to the write shield and provided outside the main magnetic pole in a width direction of the main pole with a gap, the side shield comprising an opposite surface facing the high-frequency oscillator,
the magnetic layer is provided on the opposite surface of the side shield, and
the nonmagnetic layer is provided outside the magnetic layer relative to the high-frequency oscillator in the side shield.

5. The magnetic recording head of claim 4, wherein
the write shield comprises an opposite surface facing the apical end portion of the main magnetic pole with the write gap being interposed, and
the magnetic core comprises:
a magnetic layer which is provided on a write shield side, is exposed to the opposite surface of the write shield and is continuous with the magnetic layer on the side shield; and
a nonmagnetic layer which is provided on the write shield side, is provided on a side opposite to the high-frequency oscillator of the magnetic layer in the write shield, is continuous with the nonmagnetic layer of the side shield, and contains dispersed magnetic microparticles.

6. The magnetic recording head of claim 1, wherein
the magnetic core comprises the magnetic layer constituting the apical end portion of the main magnetic pole, and
the nonmagnetic layer is provided outside the magnetic layer relative to the high-frequency oscillator in the main magnetic pole.

7. The magnetic recording head of claim 1, wherein
the high-frequency oscillator comprises the film surface extending in a direction intersecting with the air bearing surface,
the magnetic layer comprises an opposite surface facing the high-frequency oscillator, an area of the opposite surface of the magnetic layer is greater than an area of the film surface of the high-frequency oscillator, and
the nonmagnetic layer is away from an edge of the high-frequency oscillator.

8. The magnetic recording head of claim 1, wherein
the magnetic microparticles are dispersed in an entire part of the nonmagnetic layer substantially uniformly, and a contained amount of the magnetic microparticles is set to 5 to 20%.

9. A disk device comprising:
a disk-shaped recording medium comprising a magnetic recording layer; and
the magnetic recording head of claim 1, configured to record data onto the recording medium.

10. The disk device of claim 9, wherein
the write shield comprises an opposite surface facing the apical end portion of the main magnetic pole with the write gap being interposed,
the magnetic layer is exposed to the opposite surface of the write shield and faces the high-frequency oscillator, and the nonmagnetic layer covers an opposite side of the magnetic layer relative to the high-frequency oscillator in the write shield.

11. The disk device of claim 10, wherein
the high-frequency oscillator comprises the film surface extending in a direction intersecting with the air bearing surface,
the magnetic layer comprises an opposite surface facing the high-frequency oscillator, an area of the opposite surface of the magnetic layer is greater than an area of the film surface of the high-frequency oscillator, and
the nonmagnetic layer is away from an edge of the high-frequency oscillator.

12. The disk device of claim 9, wherein
the magnetic core comprises a side shield connected to the write shield and provided outside the main magnetic pole in a width direction of the main pole with a gap, the side shield comprising an opposite surface facing the high-frequency oscillator,
the magnetic layer is provided on the opposite surface of the side shield, and
the nonmagnetic layer is provided outside the magnetic layer relative to the high-frequency oscillator in the side shield.

13. The disk device of claim 12, wherein
the write shield comprises an opposite surface facing the apical end portion of the main magnetic pole with the write gap being interposed, and
the magnetic core comprises:
- a magnetic layer which is provided on a write shield side, is exposed to the opposite surface of the write shield and is continuous with the magnetic layer on the side shield; and
- a nonmagnetic layer which is provided on the write shield side, is provided on a side opposite to the high-frequency oscillator of the magnetic layer in the write shield, is continuous with the nonmagnetic layer of the side shield, and contains dispersed magnetic microparticles.

* * * * *